US006767646B2

(12) United States Patent
Seyffer et al.

(10) Patent No.: US 6,767,646 B2
(45) Date of Patent: Jul. 27, 2004

(54) POLYMER DISPERSION FOR IMPREGNATING PAPER

(75) Inventors: Hermann Seyffer, Heidelberg (DE); Titus Leman, Ludwigshafen (DE); Peter Claassen, Ludwigshafen (DE); Kai Olfermann, Kaiserslautern (DE); Thomas Wirth, Freinsheim (DE); Jürgen Schmidt-Thümmes, Neuhofen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/221,198

(22) PCT Filed: Mar. 29, 2001

(86) PCT No.: PCT/EP01/03592

§ 371 (c)(1),
(2), (4) Date: Sep. 23, 2002

(87) PCT Pub. No.: WO01/77438

PCT Pub. Date: Oct. 18, 2001

(65) Prior Publication Data

US 2003/0104233 A1 Jun. 5, 2003

(30) Foreign Application Priority Data

Apr. 5, 2000 (DE) ........................................ 100 16 810

(51) Int. Cl.[7] .......................... B32B 23/04; B32B 29/00

(52) U.S. Cl. ....................... 428/532; 428/535; 428/536; 428/537.1; 428/507; 428/511; 428/512; 428/513; 428/514; 427/201; 427/202; 427/203; 427/207; 427/208; 524/521; 524/523; 524/524

(58) Field of Search ................................. 428/532, 535, 428/536, 537.1, 507, 511, 512, 513, 514, 537.5; 427/201, 202, 203, 207, 208; 524/521, 523, 524

(56) References Cited

U.S. PATENT DOCUMENTS

| | | | | | |
|---|---|---|---|---|---|
| 3,983,307 | A | | 9/1976 | Power et al. | |
| 4,059,665 | A | * | 11/1977 | Kelley | 264/128 |
| 4,097,649 | A | * | 6/1978 | Neumann | 428/327 |
| 4,291,087 | A | * | 9/1981 | Warburton, Jr. | 442/148 |
| 4,937,282 | A | * | 6/1990 | Pfoehler et al. | 524/820 |
| 5,143,954 | A | * | 9/1992 | Hutton et al. | 524/106 |
| 5,536,766 | A | * | 7/1996 | Seyffer et al. | 524/100 |

FOREIGN PATENT DOCUMENTS

| | | |
|---|---|---|
| DE | 23 50 794 | 6/1975 |
| DE | 29 03 172 | 8/1980 |
| EP | 0 223 922 | 6/1987 |
| EP | 0 889 168 | 1/1999 |
| EP | 0 942 098 | 9/1999 |

* cited by examiner

*Primary Examiner*—Leszek B Kiliman
(74) *Attorney, Agent, or Firm*—Oblon, Spivak, McClelland, Maier & Neustadt, P.C.

(57) ABSTRACT

A process for impregnating base paper or fiber webs with an aqueous dispersion of a polymer of free-radically polymerizable compounds (monomers), which comprises from 0.1 to 5% by weight of the monomers being methacrylic acid.

9 Claims, No Drawings

POLYMER DISPERSION FOR IMPREGNATING PAPER

The present invention relates to a process for impregnating base paper or fiber webs with an aqueous dispersion of a polymer of free-radically polymerizable compounds (monomers), which comprises from 0.1 to 5% by weight of the monomers being methacrylic acid.

The invention further relates to impregnated base papers or fiber webs obtainable by the process and to the use of the impregnated base papers for producing decorative films.

Chipboard is frequently coated with decorative films and used in that state for manufacturing furniture. Decorative film consists essentially of an impregnated base paper which has been printed with a printing ink and so has the desired appearance and is generally coated with a protective coating of a formaldehyde resin.

The application properties of the decorative film are essentially determined by the impregnated base paper. Impregnating the base paper should in particular increase the strength of the base paper and effect good compatibility with the printing ink and the protective coating and in particular good cohesion between the layers in the decorative film.

EP-A-889 168 and EP-A-223 922 disclose impregnating base paper with polymer dispersions.

Useful binders for this application include commercially available emulsion polymers containing small amounts of acrylic acid and methylolmethacrylamide (e.g. Acronal® S305 D).

Prior art impregnated base papers frequently have unsatisfactory application properties. More particularly, the penetration depth into the base paper of the polymer dispersion used for the impregnation is not sufficient. Insufficient penetration depth and hence insufficient impregnation result in poor application properties, for example poor strengths of the decorative film or easy cleavability of the decorative film into individual layers.

The polymer dispersion used for impregnating should also have very low viscosity and should not coagulate during processing despite high shearing stresses. The polymer dispersion should further be readily compatible with urea- or melamine-formaldehyde resins in order that it may also be used mixed with these resins.

It is an object of the present invention to provide an impregnated base paper or fiber web meeting the above requirements.

We have found that this object is achieved by the process defined at the beginning and by the impregnated base paper or fiber web obtainable thereby.

The process of the invention utilizes an aqueous dispersion of a polymer to impregnate base paper or fiber web.

The polymer is polymerized from free-radically polymerizable compounds (monomers) and obtainable by free-radical polymerization of these monomers.

The weight percentages which follow are each based on the polymer.

The polymer contains from 0.1 to 5% by weight, preferably 0.5 to 3% by weight, particularly preferably from 1 to 2.5% by weight, of methacrylic acid (MAS).

The polymer preferably additionally contains methylolmethacrylamide (MAMol), especially in amounts of from 0.1 to 5% by weight, preferably from 1 to 4% by weight, particularly preferably from 1.0 to 2.5% by weight.

Preferably, as well as MAS and MAMol, the polymer also contains methylolacrylamide (AMol), especially in amounts of from 0.1 to 4% by weight, particularly preferably from 0.5 to 3% by weight, very particularly preferably in amounts of from 0.5 to 1.5% by weight.

When the polymer contains MAMol and AMol, the MAMol/AMol weight ratio is preferably in the range from 4:1 to 1:4, particularly preferably in the range from 2:1 to 1:2. Very particularly preferably MAMol is in excess compared with AMol, the weight ratio correspondingly being in the range from 4:1 to 1.1:1, especially in the range from 3:1 to 1.5:1.

As well as MAS, MAMol and AMol, the polymer may additionally contain methacrylamide (MAM), especially in amounts of from 0.1 to 4% by weight, preferably from 0.5 to 3% by weight, particularly preferably from 0.2 to 2% by weight.

The polymer can also contain acrylic acid. Preferably the total amount of the water-soluble compounds acrylic acid and AMol together is not more than 3% by weight, especially not more than 2.0% by weight, particularly preferably not more than 1.5% by weight.

Otherwise the polymer is preferably polymerized from main monomers so-called.

Preferably the polymer contains at least 60% by weight, particularly preferably at least 80% by weight, of units derived from main monomers (so-called) selected from $C_1$ to $C_{20}$ alkyl (meth)acrylates, vinyl esters of carboxylic acids containing up to 20 carbon atoms, vinyl aromatics with up to 20 carbon atoms, ethylenically unsaturated nitriles, vinyl halides, vinyl ethers of alcohols containing 1 to 10 carbon atoms, aliphatic hydrocarbons with 2 to 8 carbon atoms and 1 or 2 double bonds or mixtures thereof.

Useful examples are alkyl (meth)acrylates with a $C_1$–$C_{10}$-alkyl radical, such as methyl methacrylate, methyl acrylate, n-butyl acrylate, ethyl acrylate and 2-ethylhexyl acrylate.

Mixtures of alkyl (meth)acrylates are also suitable in particular.

Vinyl esters of carboxylic acids with 1 to 20 carbon atoms are for example vinyl laurate, vinyl stearate, vinyl propionate, vinyl versatate and vinyl acetate.

Useful vinyl aromatic compounds are vinyltoluene, α- and p-methylstyrene, α-butylstyrene, 4-n-butylstyrene, 4-n-decylstyrene and preferably styrene.

Examples of nitriles are acrylonitrile and methacrylonitrile.

Vinyl halides are chlorine-, fluorine- or bromine-substituted ethylenically unsaturated compounds, preferably vinyl chloride and vinylidene chloride.

Useful vinyl ethers include vinyl methyl ether and vinyl isobutyl ether. Preference is given to vinyl ethers of alcohols containing 1 to 4 carbon atoms.

Hydrocarbons with 2 to 8 carbon atoms and two olefinic double bonds are butadiene, isoprene and chloroprene; those with a double bond are for example ethene or propene.

Preferred main monomers are alkyl acrylates, styrene and especially mixtures of styrene and alkyl acrylates.

As well as these main monomers the polymer may contain further monomers, for example hydroxyl-containing monomers, especially $C_1$–$C_{10}$-hydroxyalkyl (meth) acrylates, dicarboxylic acids and their anhydrides or monoesters, for example maleic acid, fumaric acid and maleic anhydride or as constituents.

Preferred polymers are for example those which are completely polymerized from:

a) from 0.1 to 5% by weight of methacrylic acid (MAS)
b) from 0.1 to 5% by weight of methylolmethacrylamide (MaMol)
c) from 0.1 to 4% by weight of methylolacrylamide (AMol)
d) from 0 to 4% by weight of methacrylamide (MAM)

e) from 60% by weight to 99.7% by weight of the abovementioned main monomers and
f) from 0 to 20% by weight of further monomers other than a) to e), the weight percentages being based on the polymer.

Particularly preferred polymers are completely polymerized from:

a) from 0.5 to 3% by weight of MAS
b) from 1 to 4% by weight of MAMol
c) from 0.5 to 3% by weight of AMol
d) from 0.1 to 4% by weight of MAM
e) from 60 to 98.9% by weight of main monomers and
f) from 0 to 20% by weight of further monomers.

The aqueous dispersion is preferably prepared by emulsion polymerization; the polymers are therefore an emulsion polymer.

Emulsion polymerization is generally carried out using ionic and/or nonionic emulsifiers and/or protective colloids or stabilizers as surface-active compounds.

A detailed description of suitable protective colloids is given in Houben-Weyl, Methoden der organischen Chemie, Volume XIV/1, Makromolekulare Stoffe, Georg-Thieme-Verlag, Stuttgart, 1961, pages 411 to 420. Useful emulsifiers include anionic, cationic and also nonionic emulsifiers. Preferably the accompanying surface-active substances used are exclusively emulsifiers whose molecular weights, in contrast to protective colloids, are usually below 2000 g/mol. It will be appreciated that, when mixtures of surface-active substances are used, the individual components have to be compatible with each other, which is simple to verify by means of a few preliminary tests in cases of doubt. Preference is given to using anionic and nonionic emulsifiers as surface-active substances. Customary accompanying emulsifiers include for example ethoxylated fatty alcohols (EO degree: from 3 to 50, alkyl radical: $C_8$ to $C_{36}$), ethoxylated mono-, di- and trialkylphenol (EO degree: from 3 to 50, alkyl radical: $C_4$- to $C_9$), alkali metal salts of dialkyl esters of sulfosuccinic acid and also alkali metal and ammonium salts of alkyl sulfates (alkyl radical: $C_8$ to $C_{12}$), of ethoxylated alkanols (EO degree: from 4 to 30, alkyl radical: $C_{12}$ to $C_{18}$), of ethoxylated alkylphenols (EO degree: 3 to 50, alkyl radical: $C_4$ to $C_9$), of alkylsulfonic acids (alkyl radical: $C_{12}$ to $C_{18}$) and of alkylarylsulfonic acids (alkyl radical: $C_9$ to C18).

Suitable emulsifiers are also found in Houben-Weyl, Methoden der organischen Chemie, Volume 14/1, Makromolekulare Stoffe, Georg Thieme Verlag, Stuttgart, 1961, pages 192 to 208.

Trade names of emulsifiers include for example Dowfax® 2 A1, Emulan® NP 50, Dextrol® OC 50, Emulgator 825, Emulgator 825 S, Emulan® OG, Texapon® NSO, Nekanil® 904 S, Lumiten® I-RA, Lumiten E 3065, etc.

The surface-active substance is customarily used in amounts of from 0.1 to 10% by weight, based on all monomers to be polymerized.

Water-soluble initiators for the emulsion polymerization include for example ammonium and alkali metal salts of a peroxydisulfuric acid, for example sodium peroxodisulfate, hydrogen peroxide or organic peroxides, e.g. tert-butyl hydroperoxide.

Redox initiator systems in particular are suitable.

Redox initiator systems consist of at least one usually inorganic reductant and an inorganic or organic oxidant.

The oxidant component may be for example one of the emulsion polymerization initiators already mentioned. reductants include for example alkali metal salts of sulfurous acid, e.g. sodium sulfite, sodium bisulfite, alkali metal salts of disulfurous acid such as sodium bisulfite, bisulfite addition compounds of aliphatic aldehydes and ketones, such as acetone bisulfite, or reductants such as hydroxymethanesulfinic acid and salts thereof, or ascorbic acid. Redox initiator systems can be used together with soluble metal compounds whose metallic component can exist in a plurality of valency states.

Customary redox initiator systems include for example ascorbic acid/iron(II) sulfate/sodium peroxydisulfate, tert-butyl hydroperoxide/sodium disulfite, tert-butyl hydroperoxide/sodium hydroxymethanesulfinate. The individual components, for example the reductant, can also be mixtures, for example a mixture of the sodium salt of hydroxymethanesulfinic acid and sodium disulfite.

The compounds mentioned are usually used in the form of aqueous solutions, in which the lower concentration is determined by the amount of water acceptable in the dispersion and the upper concentration by the solubility of the relevant compound in water.

Generally the concentration is from 0.1 to 30% by weight, preferably from 0.5 to 2% by weight, particularly preferably from 1.0 to 10% by weight, based on the solution.

The amount of initiators is generally from 0.1 to 10% by weight, preferably from 0.2 to 5% by weight, based on all monomers to be polymerized. It is also possible to use a plurality of different initiators in the emulsion polymerization.

The emulsion polymerization is generally carried out at from 30 to 150° C., preferably at from 50 to 90° C. The polymerization medium may be just water or else a mixture of water and water-miscible liquids such as methanol. Preferably the polymerization medium used is just water. The emulsion polymerization can be carried out not only as a batch process but also in the form of a feed stream addition process, both stepwise or gradient. Preference is given to the feed stream addition process in which a portion of the polymerization batch or else a polymer seed is introduced as initial charge, heated to the polymerization temperature, incipiently polymerized and subsequently the rest of the polymerization batch is fed into the polymerization zone, usually via a plurality of spatially separate feed streams, of which one or more contain the monomers in pure or in emulsified form, continuously, stepwise or with superposition of a concentration gradient while the polymerization is maintained.

The manner in which the initiator is added to the polymerization vessel in the course of the free-radical aqueous emulsion polymerization is known to one of ordinary skill in the art. The initiator cannot only be introduced in full into the polymerization vessel as initial charge but also be added continuously or stepwise in the course of the free-radical aqueous emulsion polymerization at the rate of its consumption. Which method is chosen in any particular case will depend, in a manner known to one of ordinary skill in the art, not only on the chemical nature of the initiator system but also on the polymerization temperature. Preferably, some is introduced as initial charge and the rest is added to the polymerization zone at the rate of consumption.

Initiator is customarily also added after the actual emulsion polymerization, i.e. after at least 95% conversion of the monomers, to remove residual monomers.

The emulsion polymerization provides an aqueous dispersion of a polymer.

The aqueous polymer dispersion obtained is in the invention used for impregnating base paper or fiber webs.

The aqueous dispersion obtained can be used alone or mixed with other impregnants, for example formaldehyde resins such as melamine-formaldehyde or urea-formaldehyde resins. The fraction of formaldehyde resin can be for example in the range from 0 to 90% by weight, based on the sum total of the polymer of the aqueous dispersion and the formaldehyde resin (solid, without water).

The aqueous dispersion may have added to it additives, such as defoamers, fixatives (precipitants), flow control agents, dyes, fillers, thickeners, prior to the impregnating step.

Useful base paper includes customary fiber pulps consolidated, for example with size, into a base paper. Base papers have not been coated with a paper coating composition.

Useful fiber webs include other webs comprising natural and/or artificial fibers, for example glass fibers, pulp fibers, polyester fibers, etc. These fiber webs have preferably been preconsolidated by mechanical treatment (compression of the fibers) or chemical treatment.

The impregnating step is generally carried out in an impregnator where the base paper or the fiber web is contacted with the aqueous dispersion of the polymer on one side or preferably on both sides.

The impregnating preferably takes the form of dipping into the aqueous dispersion. After impregnation, the base paper or fiber web is generally dried, preferably at from 100 to 180° C.

The impregnated base paper or fiber web preferably contains from 5 to 40 parts by weight of polymer, based on 100 parts by weight of base paper or fiber web prior to impregnation.

The impregnated base paper can be used for producing decorative papers. The decorative papers are used for example for coating furniture or furniture components and in this context are also known as furniture decorative films.

The polymer dispersion used according to the invention for impregnating possesses good penetration characteristics essentially regardless of the particle size of the dispersed polymer particles, which is customarily in the range from 100 to 200 mm. The polymer dispersion is highly compatible with formaldehyde resins, especially urea-formaldehyde resins, and can therefore be efficiently used mixed with these resins. The polymer dispersions are stable. The papers or fiber webs impregnated with the polymer dispersions have good application properties, for example a high breaking strength.

EXAMPLES

1. Preparation of the Dispersions

General Method

The initial charge was heated to 85° C. and purged with nitrogen. Feed streams 1 and 2 were started at 85° C. and run in over 3 hours. This was followed by an hour of postpolymerization and the addition of 10% aqueous sodium hydroxide solution.

Composition for Example 1

| Initial charge | | |
|---|---|---|
| Water | 400 | g |
| Polymer (33% in water) | 24.6 | g |
| Sodium persulfate (7% in water) | 17.9 | g |

Feed Stream 1

| | | |
|---|---|---|
| Water | 337 | g |
| Arylsulfonate (15%) | 83.3 | g |
| TSPP (tetrasodium pyrophosphate, electrolyte) (35%) | 42 | g |
| MAM (15%) | 158.3 | g |
| MAMol (15%) | 50 | g |
| AS (100%) | 12.6 | g |
| Styrene (S) (100%) | 589 | g |
| n-Butyl acrylate (BA) (100%) | 590 | g |

Feed Stream 2

Sodium persulfate (7% in $H_2O$) 64.3 g

The other polymers were prepared correspondingly.

The composition of the polymers is reported in Table 1.

TABLE 1

| Polymer | Acid component | MAMol | AMol | MAM | S | BA |
|---|---|---|---|---|---|---|
| 1 | 1.0 AS | 1.4 | 1.4 | 1.9 | 47.15 | 47.15 |
| 2 | 1.9 AS | 1.4 | 1.4 | 1.9 | 46.7 | 46.7 |
| 3 | 3.0 AS | 1.4 | 1.4 | 1.9 | 46.15 | 46.15 |
| 4 | 1.0 MAS | 1.4 | 1.4 | 1.9 | 47.15 | 47.15 |
| 5 | 1.9 MAS | 1.4 | 1.4 | 1.9 | 46.7 | 46.7 |
| 6 | 3.0 MAS | 1.4 | 1.4 | 1.9 | 46.15 | 46.15 |
| 7 | 3.8 MAS | 1.4 | 1.4 | 1.9 | 45.75 | 45.75 |

2. Application Testing

Penetration characteristics:

Apparatus needed: Blauband round filter (for example from Schleicher & Schuell, $589^3$, ashless, diameter 90 mm)

Test tube (12 mm in diameter)

Stopwatch

Procedure: The dispersion is diluted in water to a solids content of 25%. 5 ml of the diluted dispersion are poured into the filter and the time is taken for the first drop to pass through the filter (=penetration time).

Also measured is the amount of dispersion which passes through the filter in the course of a further 5 minutes (after the first drop). The amount is reported as "mm fill level".

The table reports penetration time with fill level as sec/mm. The shorter the time and the higher the fill level, the better the penetration.

TABLE 2

| Test results | |
|---|---|
| Polymer | Penetration characteristics |
| 1 | 39/9.1 |
| 2 | 42/7.7 |
| 3 | 57/4.4 |
| 4 | 28/11 |
| 5 | 19/12 |
| 6 | 16/12 |
| 7 | 17/11 |

We claim:

1. A process comprising impregnating a base paper or a fiber web with an aqueous dispersion of a polymer comprising one or more free-radically polymerized compounds, wherein the polymer comprises from 0.1 to 5% by weight of methacrylic acid units, from 0.1 to 5% by weight of methylolmethacrylamide units and from 0.1 to 4% by weight of methylolacrylamide units.

2. The process as claimed in claim 1, wherein the ratio of weight fractions of methylolacrylamide units to methylolmethacrylamide units is from 4:1 to 1:4.

3. The process as claimed in claim 1, wherein the polymer comprises from 0.1 to 5% by weight of methacrylic acid units, from 0.1 to 5% by weight of methylolmethacrylamide units from 0.1 to 3% by weight of methlolacrylamide units and from 0.1 to 4% by weight of methacrylamide units.

4. The process as claimed in claim 1, wherein the polymer further comprises at least 60% by weight of main monomeric units selected from the group consisting of C1 to C20 alkyl (meth)acrylates, vinyl esters of carboxylic acids containing up to 20 carbon atoms, vinyl aromatics with up to 20 carbon atoms, ethylenically unsaturated nitriles, vinyl halides, vinyl ethers of alcohols containing 1 to 10 carbon atoms, allyl ethers of alcohols containing 1 to 10 carbon atoms, aliphatic hydrocarbons with 2 to 8 carbon atoms and 1 or 2 double bonds and mixtures thereof.

5. An impregnated base paper or impregnated fiber web obtained by the process as claimed in claim 1.

6. Chipboard or wood furniture coated with the impregnated base paper as claimed in claim 5.

7. An emulsion polymer comprising:

a) from 0.1 to 5% by weight of units of methacrylic acid b) from 0.1 to 5% by weight of units of methlolmethacrylamide c) from 0.1 to 4% by weight of units of methylolacrylamide d) from 0 to 4% by weight of units of methacrylamide and e) from 60% by weight to 99.7% by weight of units of one or more main monomers selected from the group consisting of C1 to C20 alkyl (meth)acrylates, vinyl esters of carboxylic acids containing up to 20 carbon atoms, vinyl aromatics with up to 20 carbon atoms, ethlenically unsaturated nitriles, vinyl halides, vinyl ethers of alcohols containing 1 to 10 carbon atoms, allyl ethers of alcohols containing 1 to 10 carbon atoms, aliphatic hydrocarbons with 2 to 8 carbon atoms and 1 or 2 double bonds and mixtures thereof, and f) from 0 to 20% by weight of units of further monomeric units other than a) to e), wherein the weight percentages are based on the weight of the emulsion polymer.

8. The process as claimed in claim 2, wherein the polymer comprises from 0.1 to 5% by weight of methacrylic acid units, from 0.1 to 5% by weight of one or more methlolmethacrylamide units, from 0.1 to 3% by weight of methylolacrylamide units and from 0.1 to 4% by weight of methacrylamide units.

9. A decorative paper comprising the impregnated base paper as claimed in claim 5.

* * * * *